(12) United States Patent
Wang et al.

(10) Patent No.: US 10,030,745 B2
(45) Date of Patent: Jul. 24, 2018

(54) CONTINUOUSLY VARIABLE TRANSMISSION

(71) Applicant: NATIONAL TSING HUA UNIVERSITY, Hsinchu (TW)

(72) Inventors: Pair-Ru Wang, Hsinchu (TW); Tzu-Yang Cheng, Lukang Township, Changhua County (TW); Hsiao-Wei Chiang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 274 days.

(21) Appl. No.: 15/175,887

(22) Filed: Jun. 7, 2016

(65) Prior Publication Data

US 2017/0248207 A1    Aug. 31, 2017

(30) Foreign Application Priority Data

Feb. 26, 2016    (TW) .............................. 105105774 A

(51) Int. Cl.
*F16H 9/24*    (2006.01)
(52) U.S. Cl.
CPC ..................................... *F16H 9/24* (2013.01)
(58) Field of Classification Search
CPC ..... F16H 9/24; F16H 9/10; F16H 9/18; F16H 55/56; F16H 55/38; F16H 37/0846
See application file for complete search history.

(56) References Cited

U.S. PATENT DOCUMENTS

| | | | |
|---|---|---|---|
| 5,049,113 A * | 9/1991 | Graham, Jr. | F16H 55/38 474/13 |
| 9,855,993 B2 * | 1/2018 | Rockwood | F16H 9/24 |
| 2011/0053717 A1 * | 3/2011 | Miura | F16H 9/18 474/46 |
| 2011/0059821 A1 * | 3/2011 | Lee | F16H 9/10 474/8 |

* cited by examiner

*Primary Examiner* — William E Dondero
*Assistant Examiner* — Robert T Reese
(74) *Attorney, Agent, or Firm* — Muncy, Geissler, Olds & Lowe, P.C.

(57) ABSTRACT

A continuously variable transmission (CVT) includes a power transmission mechanism and at least one conical disk. The power transmission mechanism has a contact surface, and the power transmission mechanism includes a plurality of engaging elements. The plurality of engaging elements are retractably disposed on the contact surface. The disk surface of the conical disk has a plurality of engaging walls capable of engaging with the engaging elements. The continuously variable transmission is able to transmit power by way of engagement, such that the coupling between the power transmission mechanism and the conical disk is more stable. Thus, the continuously variable transmission is adaptable to high torsion application.

10 Claims, 15 Drawing Sheets

CONTINUOUSLY VARIABLE TRANSMISSION

CROSS-REFERENCE TO RELATED APPLICATION

This application claims the benefit of Taiwan Patent Application No. 105105774, filed on Feb. 26, 2016, in the Taiwan Intellectual Property Office, the content of which is incorporated herein in its entirety by reference.

BACKGROUND OF THE INVENTION

1. Field of the Invention

The present disclosure generally relates to a transmission device, and in particular, to a continuously variable transmission.

2. Description of the Related Art

Technically, the continuously variable transmission (CVT) is configured to transmit power through metallic belt and the roller having the variable diameter. The effective gear ratio of the CVT varies infinitesimally between a maximum value and a minimum value to achieve the function of step-less transmission. Compared with the other mechanisms designed with a finite amount of gear ratios, the input shaft of the CVT can be maintained at constant angular velocity to generate output angular velocity in a certain range.

For the sake of effectively transmitting power, the slippage between the metallic belt and rollers of the CVT are not allowed. In addition, the operations of the metallic belt and the rollers generate a lot of heat; the additional heat caused by the slippage may burn or cause serious damage to the internal components of the CVT. In order to increase the static friction, pressure may be exerted to the metallic belt and rollers. However, if the friction is increased, the efficiency of power transmission reduces and the fuel consumption increases accordingly.

SUMMARY OF THE INVENTION

In view of the aforementioned technical problems, the objective of the present disclosure provides a continuously variable transmission.

In accordance with an embodiment of the present disclosure, the continuously variable transmission includes a power transmission mechanism and at least one conical disk. The power transmission mechanism has a contact surface. The power transmission mechanism includes a plurality of engaging elements which are retractably disposed on the contact surface. The conical disk has a plurality of engaging walls which extend from a center of the conical disk to an outer region of the conical disk. Each engaging wall has a side wall and a top wall, wherein the top wall faces the contact surface, and the side wall engages with the top wall and substantially extends along a tangent of the radial direction of the conical disk. Wherein, some of the engaging elements are in contact with the side wall while some of the engaging elements are in contact with the top wall.

In accordance with a selected embodiment of the present disclosure, the continuously variable transmission further includes an internal power transmission ring, a first external power transmission ring and a flexible element. The first external power transmission ring is disposed at one side of the internal power transmission ring. The flexible element is disposed in the internal power transmission ring. Wherein one of the engaging elements is disposed at one end of the flexible element and penetrates the first external power transmission ring.

In accordance with a selected embodiment of the present disclosure, the continuously variable transmission further includes a second external power transmission ring disposed at the other side of the internal power transmission ring. Wherein another one of the engaging elements is disposed at the other end of the flexible element and penetrates the second external power transmission ring.

In accordance with a selected embodiment of the present disclosure, the contact surface and the disk surface of the conical disk have substantially equal same gradients.

In accordance with a selected embodiment of the present disclosure, the continuously variable transmission further includes a power transmission ring and a flexible element. The power transmission ring has a recess. The flexible element is disposed in the recess. Wherein one of the engaging elements slidably penetrates one sidewall of the recess and couples to one end of the flexible element, and another one of the engaging elements slidably penetrates the other sidewall of the recess and couples to the other end of the flexible element.

In accordance with a selected embodiment of the present disclosure, the continuously variable transmission further includes a plurality of transmission elements. Two adjacent transmission elements are pivotally coupled with each other. Each transmission element includes a tubular body and a flexible element. The flexible element is disposed in the tubular body. Wherein one of the engaging elements slidably penetrates one side of the tubular body and couples to one end of the flexible element, and another one of the engaging elements slidably penetrates the other side of the tubular body and couples to the other end of the flexible element.

In accordance with a selected embodiment of the present disclosure, the continuously variable transmission further includes a transmission belt and a plurality of clamping pieces. The plurality of clamping pieces clamp one side of the transmission belt. Wherein each clamping piece includes an accommodating space and a flexible element. The flexible element is disposed in the accommodating space. Wherein one of the engaging elements slidably penetrates one side of the clamping piece and couples to one end of the flexible element, and another one of the engaging elements slidably penetrates the other side of the clamping piece and couples to the other end of the flexible element.

In accordance with a selected embodiment of the present disclosure, the conical disk is a ratchet-like conical disk or a gear-like conical disk.

In accordance with a selected embodiment of the present disclosure, there are at least four conical disks. The continuously variable transmission further includes a first transmission shaft and a second transmission shaft. Wherein the first transmission shaft couples with two of the conical disks and the second transmission shaft couples with the other two conical disks, and a position where the engaging elements of the power transmission mechanism engage with the conical disks is at respective sides of the first transmission shaft and the second transmission shaft; wherein the respective sides of the first transmission shaft and the second transmission shaft are away from each other.

In accordance with a selected embodiment of the present disclosure, a position where the engaging elements of the power transmission mechanism engage with the conical disks is at respective sides of the first transmission shaft and the second transmission shaft; wherein the respective sides of the first transmission shaft and the second transmission shaft are opposite to each other.

In conclusion, one or more embodiments of the continuously variable transmission provided by the present disclosure can transmit power by way of "engagement". Hence, the coupling between the power transmission mechanism and the conical disk is more stable, such that the present invention is adaptable to high torsion or high power density application.

DETAILED DESCRIPTION OF THE PREFERRED EMBODIMENTS

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

As used herein, "around", "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated.

Figure 1:
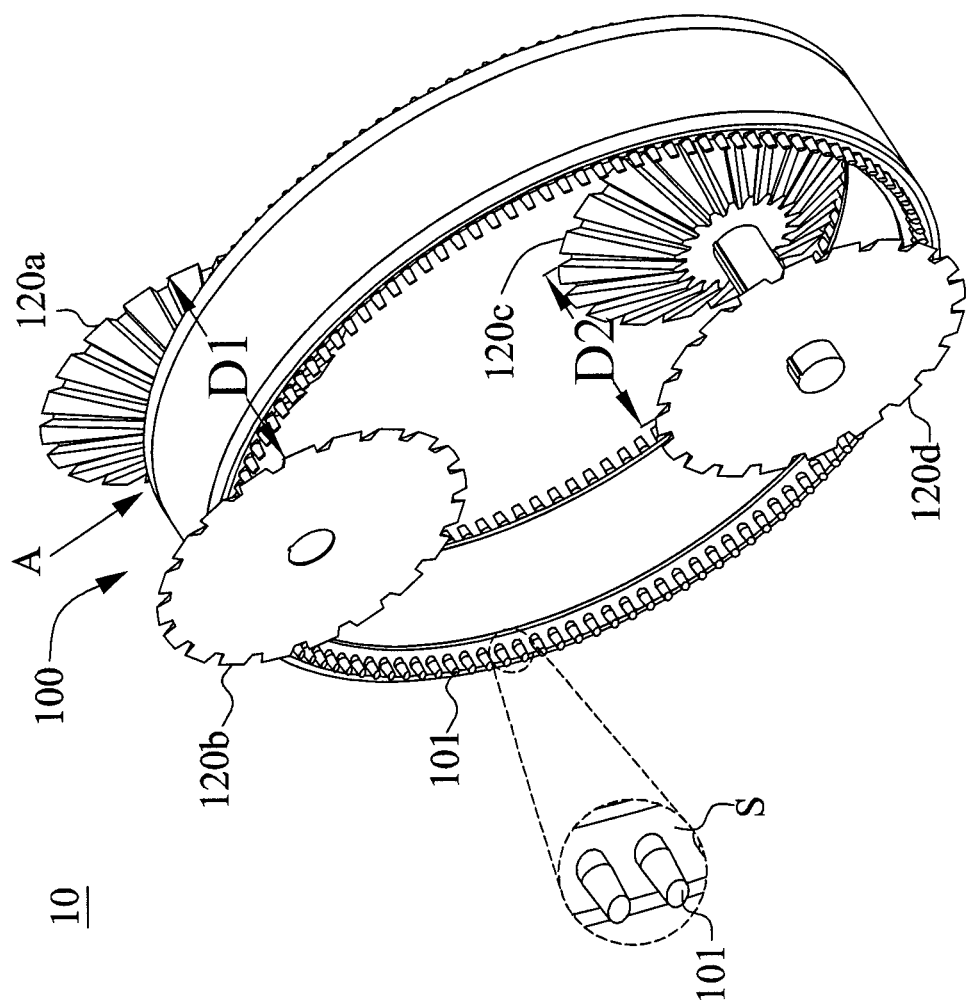
FIG. 1 is an assembly drawing of an embodiment of the continuously variable transmission of the present disclosure.
Figure 2:
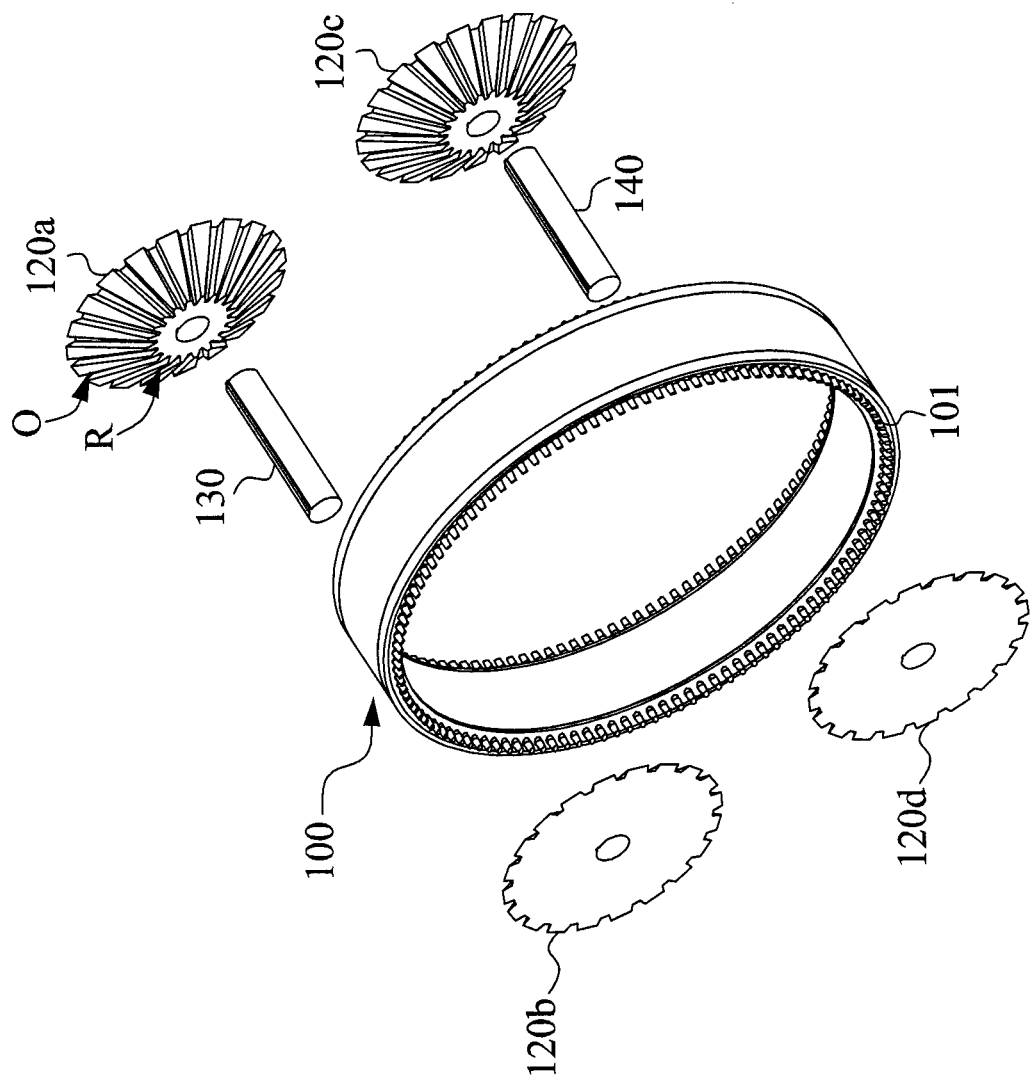
FIG. 2 is an exploded view of the FIG. 1.

FIG. 1 is an assembly drawing of an embodiment of the continuously variable transmission of the present disclosure and FIG. 2 is an exploded view of FIG. 1. With reference to FIG. 1 and FIG. 2, a continuously variable transmission 10 includes a power transmission mechanism 100 and a plurality of conical disks. As shown in the figures, the continuously variable transmission 10 is disposed with four conical disks 120a, 120b, 120c and 120d. Here, the conical disks 120a and 120b are pivotally coupled with each other, and the conical disks 120c and 120d are pivotally connected with each other. The power transmission mechanism 100 is disposed between the conical disks 120a and 120b and the conical disks 120c and 120d. As such, by varying the distances D1 and D2 between the conical disks 120a and 120b and the conical disks 120c and 120d, the position of the power transmission mechanism 100 is shifted, thereby achieving the function of gear shift.

To be more precise, the power transmission between the power transmission mechanism 100 and the conical disks 120a and 120b, as well as between the power transmission mechanism 100 and the conical disks 120c and 120d are achieved through 'mutual engagement' instead of 'friction'. Hence, one or more embodiments of the continuously variable transmission 10 disclosed in the present disclosure are able to greatly reduce the power loss resulted from the friction force between the conical disks 120a, 120b, 120c and 120d and the power transmission mechanism 100 so as to transmit power more effectively. In addition, the 'mutual engagement' further stabilizes the coupling between the power transmission mechanism 100 and the conical disks 120a and 120b, such that the present invention is able to operate under high torsion or high power density environment, such as supercar or turbomachine e.g. power station, jet engine, and so on. For the sake of clarity, the following paragraphs will explicitly explain the "mutual engagement" mechanism between the power transmission mechanism 100 and the conical disks 120a, 120b, 120c and 120d.

Figure 3:
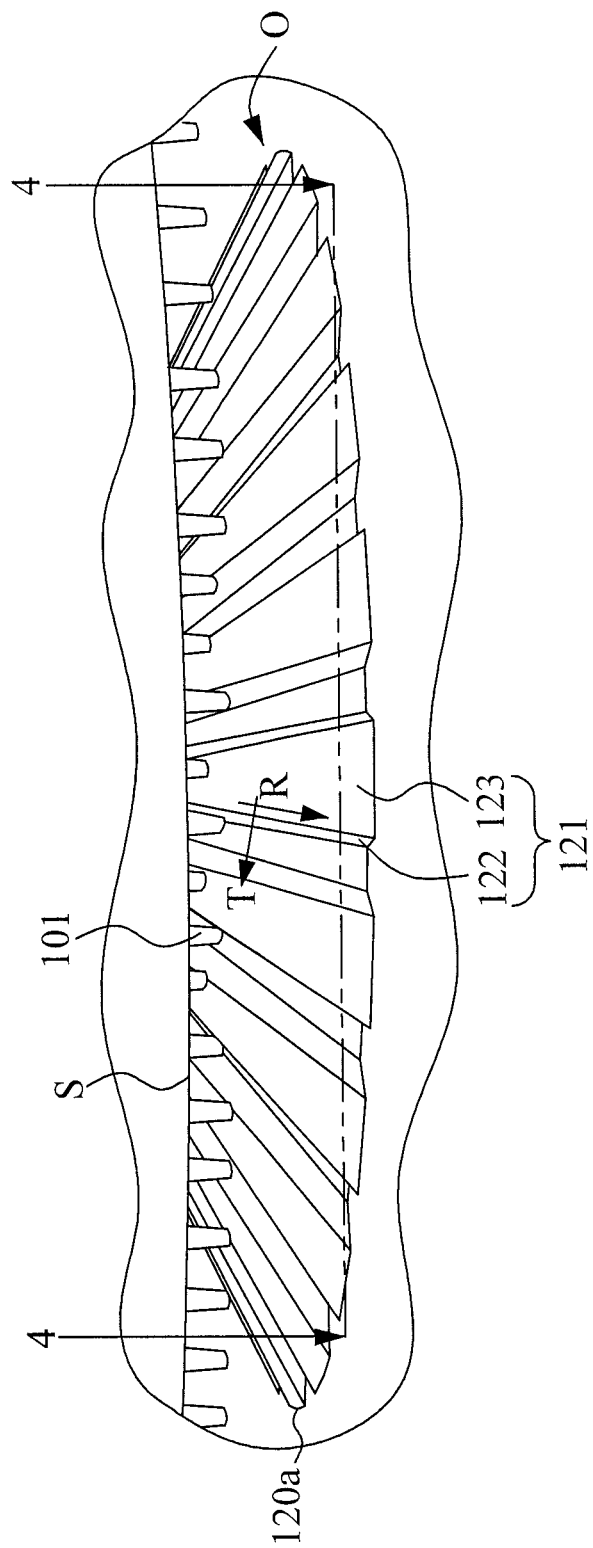
FIG. 3 is an enlarged drawing of the conical disk and the power transmission mechanism in the FIG. 1 viewed from the direction A.
Figure 4:
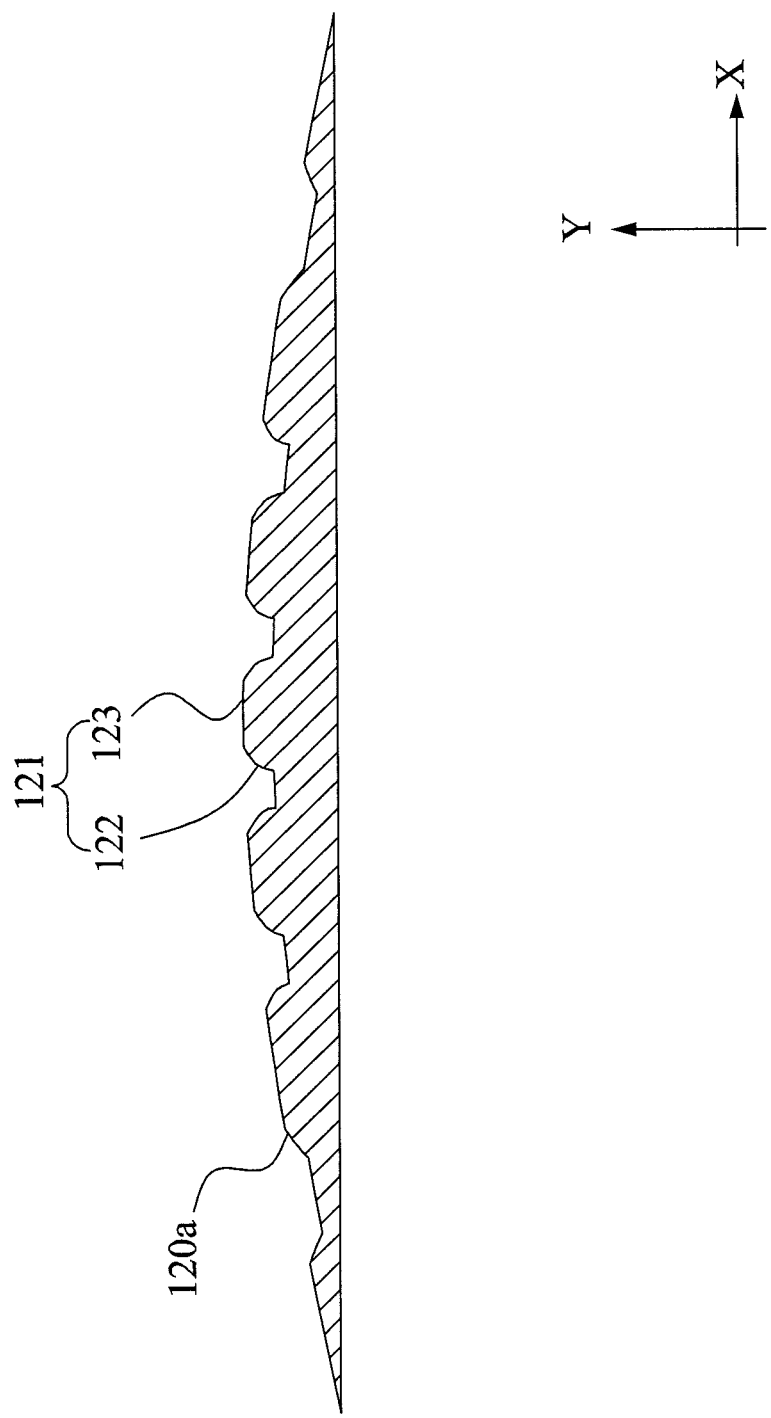
FIG. 4 is a sectional diagram illustrating the conical disk and the power transmission mechanism in FIG. 3 taken along the line segment 4-4.

FIG. 3 is an enlarged drawing of the conical disk 120a and the power transmission mechanism 100 in the FIG. 1 viewed from the direction A. As can be appreciated in FIGS. 1 to 3, the power transmission mechanism 100 includes a contact surface S and a plurality of engaging elements 101 retractably disposed on the contact surface S. The conical disk 120a has a plurality of engaging walls which extend from a center R of the conical disk 120a to an outer region O of the conical disk 120a. FIG. 4 is a sectional diagram illustrating the conical disk and the power transmission mechanism in FIG. 3 taken along the line segment 4-4. Each engaging wall 121 is disposed with a side wall 122 and a top wall 123; wherein the top wall 123 faces the contact surface S. The side wall 122 connects to the top wall 123 and substantially extends along a tangent T of a radial direction R of the conical disk 120a. What has to be addressed herein is that the "radial direction" indicates a direction of the radius, for example, the direction extending from the center of the conical disk 120a towards the circumference thereof and perpendicular to the circumference of the conical disk 120a. In addition, the term 'tangent of the radial direction' refers to the direction perpendicular to the radial direction.

As can be further appreciated in FIG. 3, some of the engaging elements 101 are in contact with the side wall 122 of the engaging wall 121, and some of the engaging elements 101 are in contact with the top all 123 of the engaging wall 121. As such, in an exemplary embodiment, the conical disks 120a and 120b may be configured to serve as the input shaft and the conical disks 120c and 120d may be configured to serve as the output shaft. When the conical disks 120a and 120b rotate, the side walls 122 of the conical disks 120a and 120b drive the engaging elements 101 contacting the side walls 122 so as to drive the power transmission mechanism 100 to rotate. Similarly, the power transmission mechanism may transmit power to the conical disks 120a and 120b through the engaging elements 101.

In addition, when the angular velocity of the input shaft, e.g. the conical disks 120a and 120b is increased, the distance between the conical disks 120a and 120b may be reduced via the force exerted by a centrifugal device which pushes the conical disks 120a and 120b closer to each other. The power transmission mechanism 100 engages with the outer region O of the conical disks 120a and 120b since the distance D1 between the conical disks 120a and 120b shortens. Since the overall shape of the power transmission mechanism 100 is fixed and the distance between the conical disks 120a and 120b and conical disks 120c and 120d remains constant, when the power transmission mechanism 100 engages with the outer region O of the conical disks 120a and 120b, the conical disks 120c and 120d are stretched apart to achieve the continuously variable transmission. Besides, as shown in FIG. 3, for the engaging walls 121 of the conical disks 120a, 120b, 120c and 120d, the distances between adjacent side walls 122 increase along the path from the center C to the outer region O. Hence, as shown in FIG. 3, certain engaging elements 101 are longer and the others are shorter in length, i.e. the engaging elements 101 are retractable to facilitate the power transmission mechanism 100 to effectively engage with the four conical disks 120a, 120b, 120c and 120d no matter in the center C or the outer region O of the four conical disks 120a, 120b, 120c and 120d.

It has to be noted that the four taper disks 120a, 120b, 120c and 120d are applied in the foregoing embodiment, but the amount of conical disks shall not be limited thereto, in other embodiments there might be more than four or less than four conical disks. Any modifications having retractable engaging elements capable of engaging with the power transmission mechanism all belong to the scope of the present disclosure.

In a selected embodiment, the four conical disks 120a, 120b, 120c and 120d might be primary sliding sheaves for common continuously variable transmission (CVT), but it shall not be limited thereto. In some embodiments, some of the four conical disks 120a, 120b, 120c and 120d might be primary sliding sheaves and the others might be secondary sliding sheaves or primary fixed sheaves for common CVT. In addition, in the embodiment mentioned above, the centrifugal device used to push the four conical disks 120a, 120b, 120c and 120d closer to one another might be the weight roller, but it shall not be limited thereto. In the other selected embodiment, the distance D1 between the conical disks 120a and 120b or the distance D2 between the conical disks 120c and 12d may be modified with other techniques known in the art. Moreover, in some embodiments, the centrifugal device may be integrated into the conical disks 120a, 120b, 120c and 120d or be disposed or connected to the conical disks 120a, 120b, 120c and 120d the according to the actual requirement.

The engaging elements 101 can be arranged into configuration with equal intervals, varying intervals or arrange into other configurations according to the actual requirement. Besides, the exposed length of the engaging elements 101 shall be designed to be able to contact the bottom of the side wall 122 of the engaging wall 121, but it shall not be limited thereto. In some embodiments, as long as the engaging elements 110 is able to come into contact with the side wall 122, the four conical disks 120a, 120b, 120c and 120d and the power transmission mechanism 100 is able to engage with one another. In practice, the engaging elements 101 might be the engagement tooth, but it shall not be limited thereto.

The four conical disks 120a, 120b, 120c and 120d in the previous embodiments may be the gear-like conical disks 120a, 120b, 120c and 120d. That is, a plurality of recesses are formed among the engaging walls 121 of the four conical disks 120a, 120b, 120c and 120d, but it shall not be limited thereto. In the other selected embodiments, the four conical disks 120a, 120b, 120c and 120d may be ratchet-like.

Figure 5:
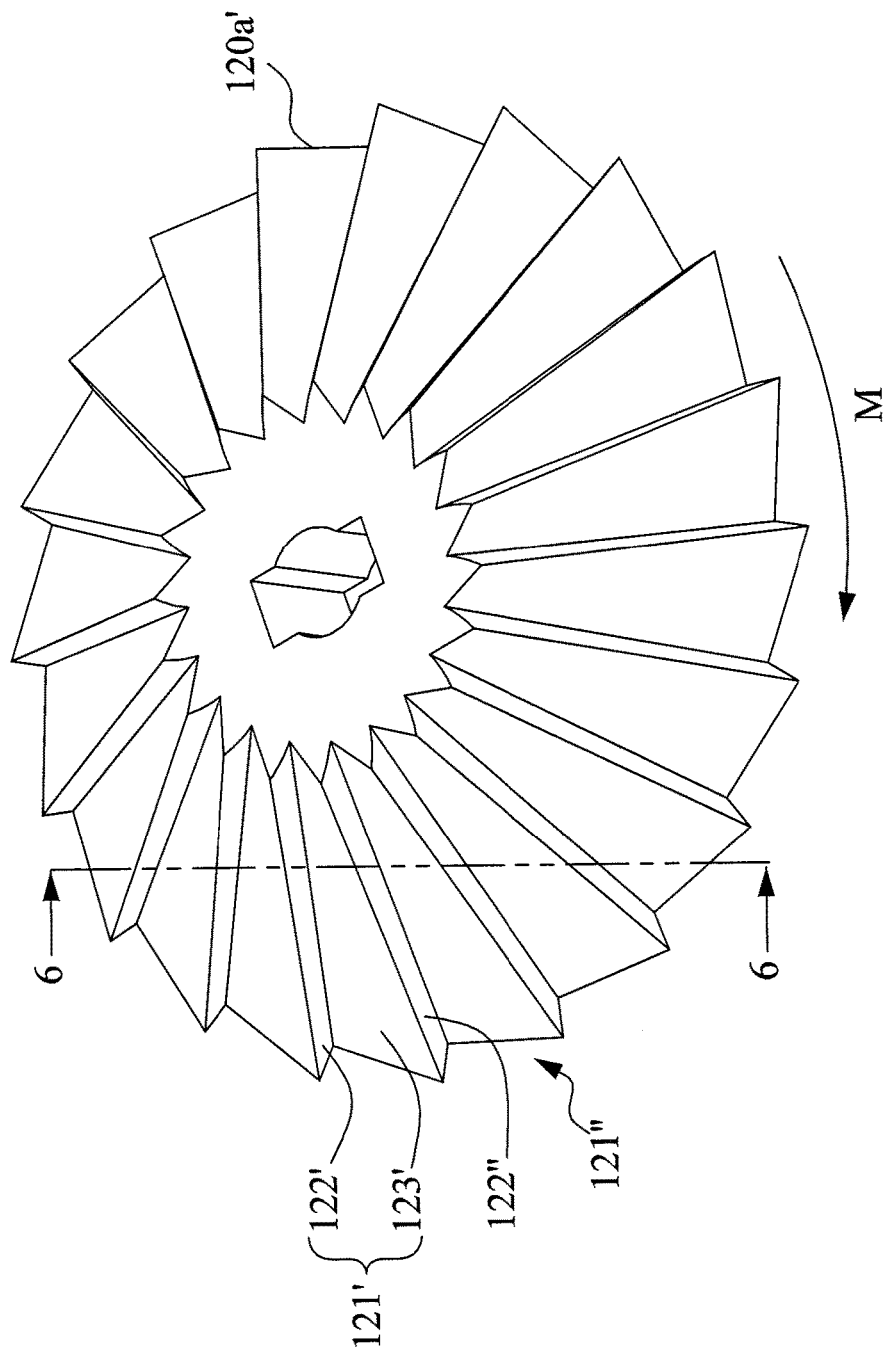
FIG. 5 is a 3D diagram of the embodiment of the ratchet-like conical disk of the present invention.
Figure 6:
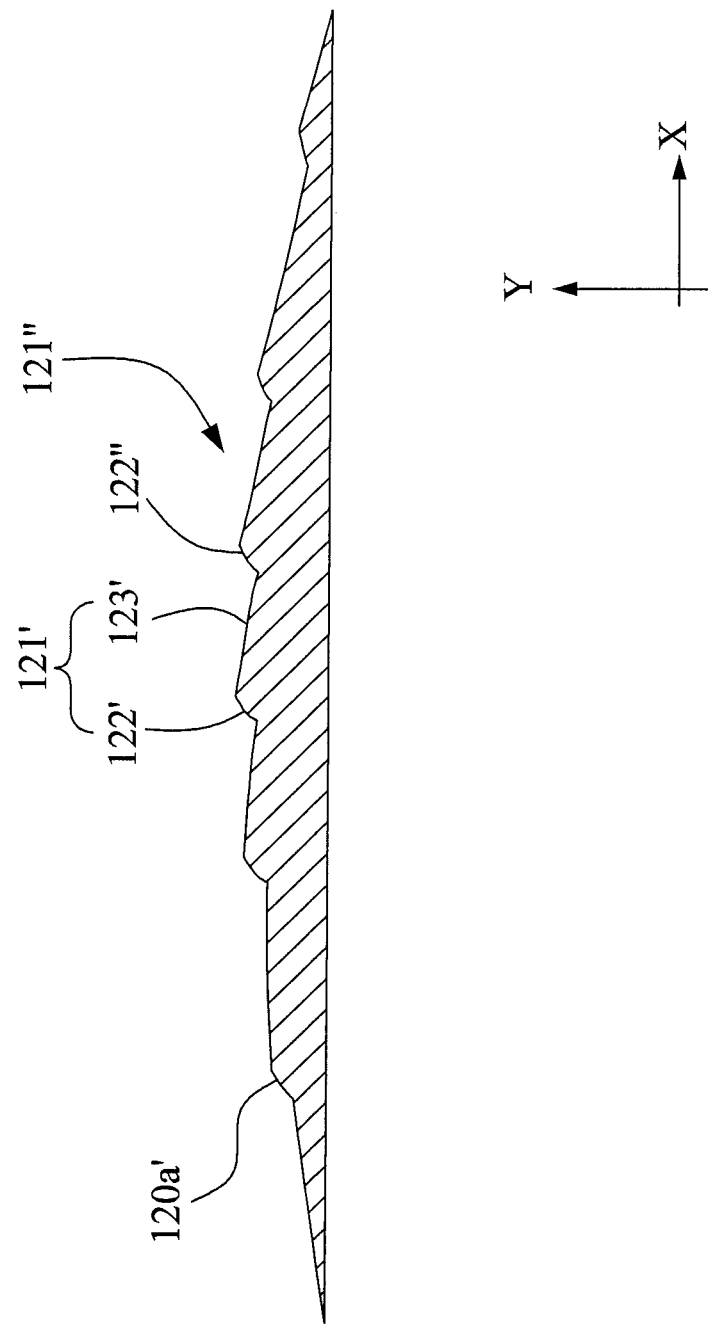
FIG. 6 is a sectional diagram illustrating ratchet-like conical disk in the FIG. 5 taken along the line segment 6-6.

Referring to FIG. 5 and FIG. 6, FIG. 5 is a 3D diagram of the embodiment of the ratchet-like conical disk whereas FIG. 6 is a sectional diagram illustrating ratchet-like conical disk in the FIG. 5 taken along the line segment 6-6. As shown in the figures, the adjacent engaging walls 121' and 121" of the conical disk 120a' are coupled with each other. To be more precise, the top wall 123' of the engaging wall 121' couples with the top portion of the side wall 122' and the bottom of the side wall 122" of the adjacent engaging wall 121". Hence, with the continuously variable transmission 10 of the present disclosure, the power transmission mechanism 100 is configured to drive the conical disk 120a' in a fixed direction M, such that when the engaging element 101 is moving between the center C and the outer region O of the conical disk 120a', the engaging element 101 will not accidentally couple with the engaging wall 121 in a direction opposite to the fixed direction M. Consequently, the ratchet-like conical disk 120a' applied in the present embodiment facilitates the operational stability of the continuously variable transmission 10.

In the previous embodiment, the conical disks with two different structures are presented, but the present invention shall not be limited thereto. In practice, any conical disks capable of effectively engaging with the engaging elements 101 of the power transmission mechanism 100 shall be included into the scope of the present disclosure.

Figure 7:
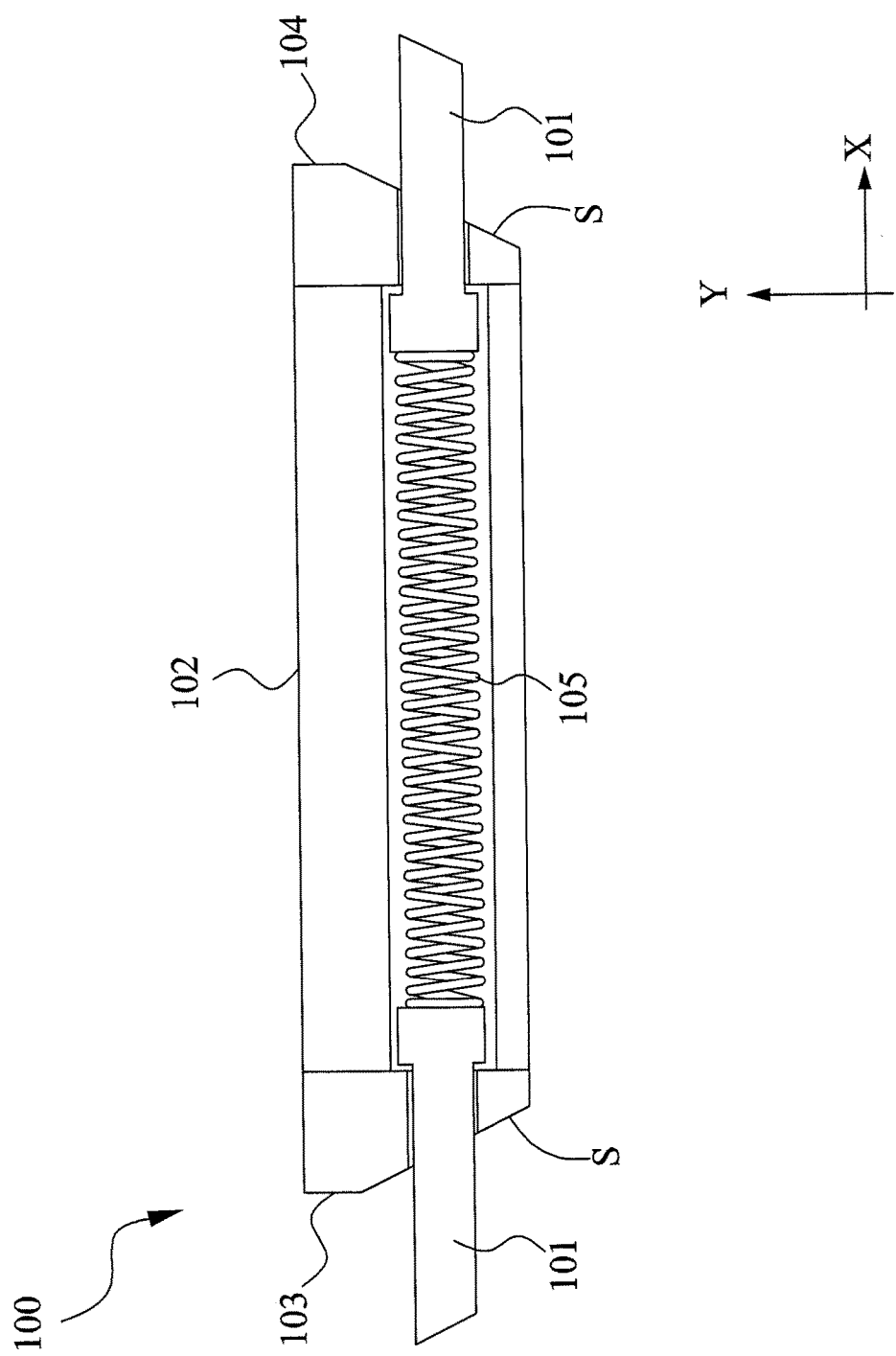
FIG. 7 is a sectional diagram of one embodiment of the power transmission mechanism of the present disclosure.

In addition to the various embodiments of the conical disks mentioned hereinbefore, there are various embodiments for the power transmission mechanism of the present as well. Referring to FIG. 7, which is a sectional diagram of one embodiment of the power transmission mechanism of the present disclosure. As shown in the figure, the power transmission mechanism 100 includes an internal power transmission ring 102, a first external power transmission ring 103, a second external power transmission ring 104 and a flexible element 105. The first external power transmission ring 103 is disposed at one side of the internal power transmission ring 102. The second external power transmission ring 104 is disposed at the other side of the internal power transmission ring 102. The flexible element 105 is disposed in the internal power transmission ring 102.

In addition, both ends of the flexible element 105 may be respectively coupled with the engaging element 101. More specifically, one of the plurality of engaging elements 101 aforementioned may couple with one end of the flexible element 105 and may penetrate the first external power transmission ring 103. The other one of the plurality of engaging elements 101 in previous embodiments may couple with the other end of the flexible element 105 and penetrate the second external power transmission ring 104. It shall addressed herein that the term "penetrate" mentioned above means that the flexible element 105 is slidably disposed on and passes through the first external power transmission ring 103 or the second external power transmission ring 104 instead of being fixed on the first external power transmission ring 103 or the second external power transmission ring 104. Hence, the extension or contraction of the flexible element 105 endows the engaging elements 101 of the power transmission mechanism 100 with the ability to retract.

In the selected embodiment of FIG. 7, the engaging elements 101 are disposed at the two respective ends of the flexible element 105. As shown in FIG. 7, the engaging elements 101 may couple with the respective ends of the flexible elements 105, but the present invention shall not be limited thereto. In the other embodiments, the engaging elements 101 are capable of coupling with or fixed at the two respective ends of the flexible element 105. In addition, in certain embodiments, the engaging elements 101 may only be disposed at one end of the flexible element 105 without affecting the engagement operation between the power transmission mechanism 100 and the four conical disks 120a, 120b, 120c and 120d.

In an embodiment, the internal power transmission ring 102, the first external power transmission ring 103 and the second external power transmission ring 104 may be manufactured via 3D printing technology, but it shall not be limited thereto. In other embodiments, the internal power transmission ring 102, the first external power transmission ring 103 and the second external power transmission ring 104 may be made via other methods such as punching, injection molding, and so on. Besides, in a selected embodiment, the aforementioned internal power transmission ring 102, the first external power transmission ring 103, the second external power transmission ring 104, the flexible element 105 and the engaging elements 101 can be made of the materials with high tensile strength and stiffness such that the present invention is suitable for high torsion application. In the other embodiments, the flexible element 105 may be the compression spring, a pair of mutually repulsive permanent magnets or electromagnets; but the present invention shall not be limited thereto.

Figure 8:
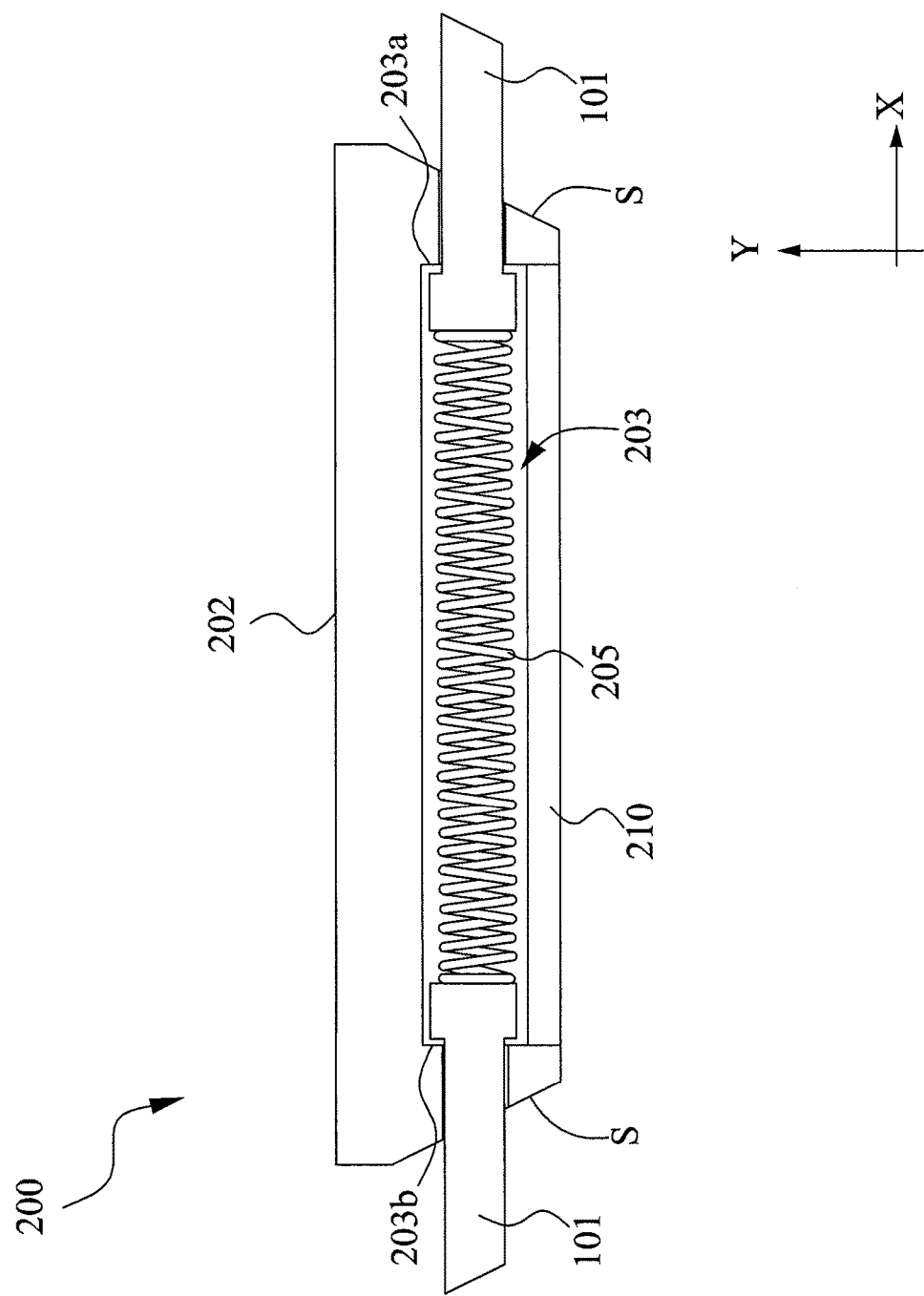
FIG. 8 is a sectional diagram of another embodiment of the power transmission mechanism of the present disclosure.

FIG. 8 is a sectional diagram of another embodiment of the power transmission mechanism of the present disclosure. As shown in the figure, the power transmission mechanism 200 includes a power transmission ring 202 and a flexible element 205. The power transmission ring 202 is disposed with a recess 203 and the flexible element 205 is disposed in the recess 203. One of the engaging elements 101 of the previous embodiments slidably penetrates one sidewall 203a of the recess 203 and couples with one end of the flexible element 205. The other one of the engaging elements 101 slidably penetrates the other sidewall 203b of the recess 203 and couples with the other end of the flexible element 205. The difference between the present embodiment and that shown in FIG. 7 is that the power transmission mechanism 200 applied in the present embodiment is integrally formed, so process such as punching, injection molding, etc. rather than 3D printing may be more suitable for the manufacturing of the power transmission mechanism 200.

Referring to FIG. 8 again, in an embodiment, the power transmission mechanism 200 may partially cover the recess 203 of the power transmission ring 202 with a cover plate 210 so as to protect the flexible element 205 disposed in the recess 203. In practice, the cover plate 210 may be selectively disposed.

Figure 9:
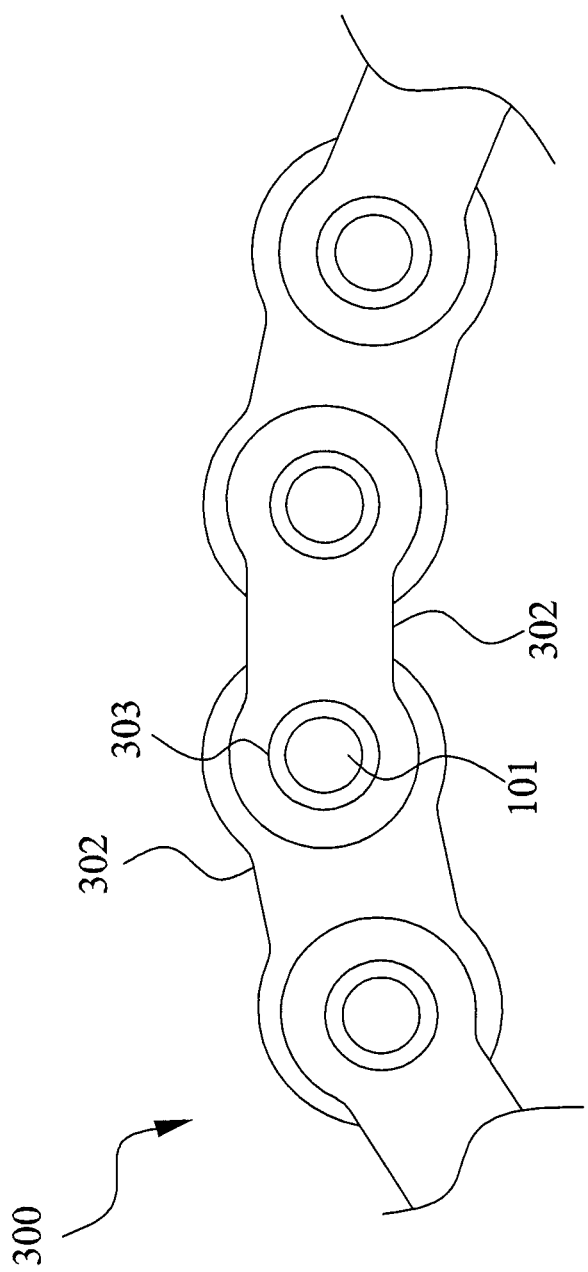
FIG. 9 is a side view of yet another embodiment of the power transmission mechanism of the present disclosure.
Figure 10:
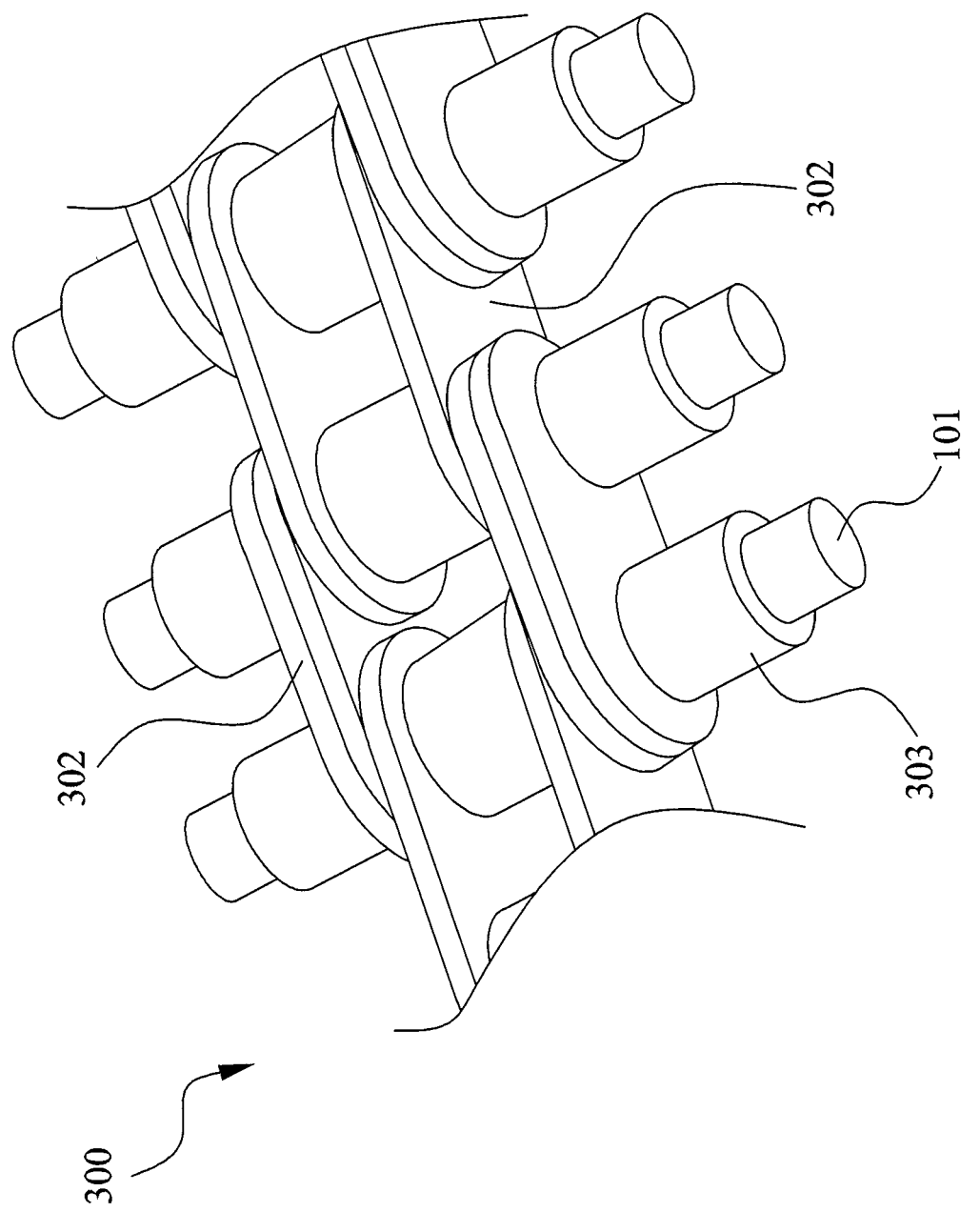
FIG. 10 is a 3D diagram illustrating a part of the power transmission mechanism shown in FIG. 9.
Figure 11:
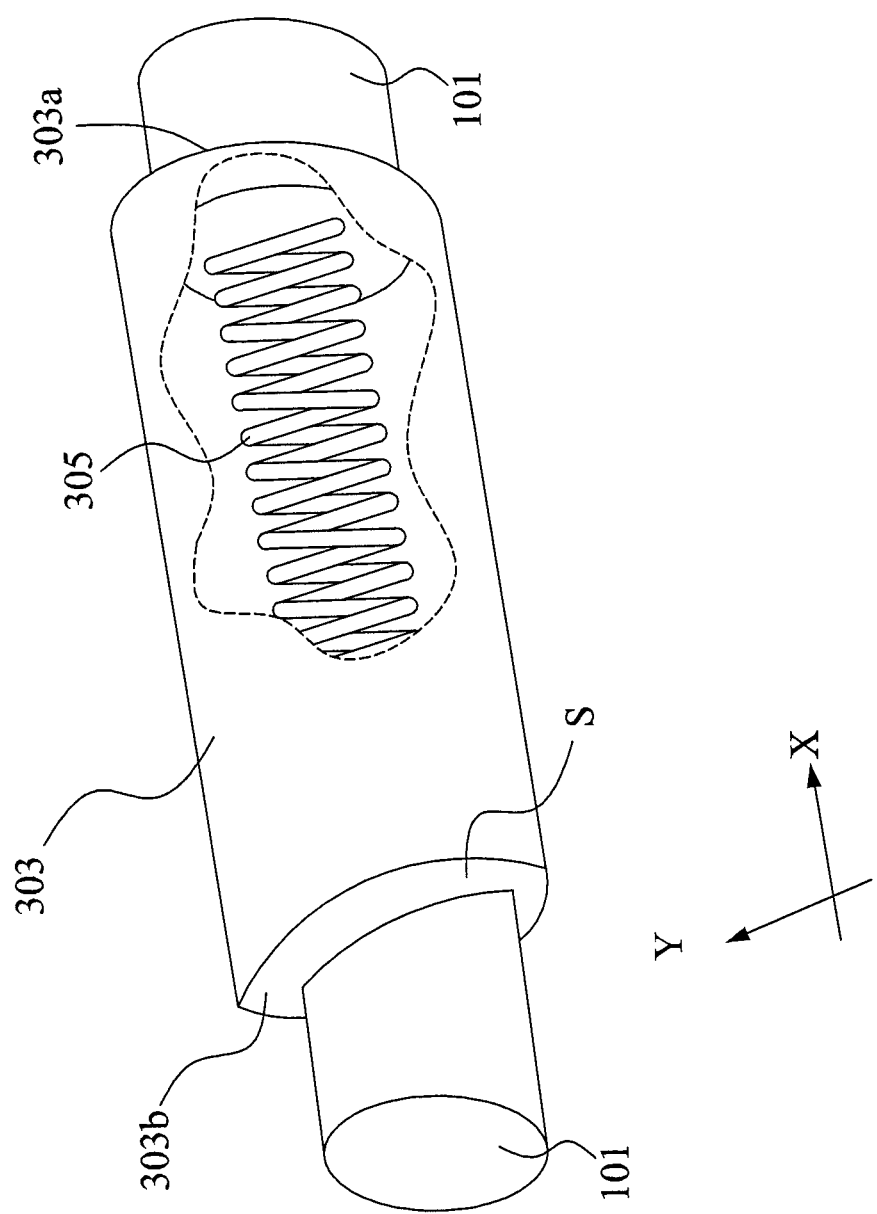
FIG. 11 is a perspective view illustrating a part of the transmission element shown in FIG. 9.

Referring to FIG. 9 through FIG. 11, which are respectively a side view of yet another embodiment of the power transmission mechanism of the present disclosure, a 3D diagram illustrating a part of the power transmission mechanism shown in FIG. 9, and a perspective view illustrating a part of the transmission element shown in FIG. 9. As shown in the figures, the power transmission mechanism 300 includes a plurality of transmission elements 302, wherein two adjacent transmission elements 302 are pivotally coupled with each other. Each transmission element 302 includes at least one tubular body 303 and at least one flexible element 305. The flexible element 305 is disposed in the tubular body 303. One of the plurality of engaging elements 101 of previous embodiments slidably penetrates one side 303a of the tubular body 303 and couples with one end of the flexible element 305. The other one of the plurality of engaging elements 101 slidably penetrates the other end 303b of the tubular body 303 and couples with the other end of the flexible element 305.

The difference between the embodiments shown in FIGS. 9-11 and that shown in the other figures lies that the power transmission mechanism 300 applied in the present embodiment is not a ring structure but a plurality of transmission elements 302 pivotally coupling with one another. In practice, the power transmission mechanism 300 applied in the present embodiment can be made of chains, but it shall not be limited thereto. Similar to previous embodiments, the extension or contraction of the flexible element 305 of the present embodiment endows the engaging elements 101 of the power transmission mechanism 300 with the ability to retract, so that the power transmission mechanism 300 is able to engage the conical disks 120a, 120b, 120c and 120d.

It shall be addressed that the ring-like power transmission mechanisms 100 and 200 applied in the aforesaid embodiments has a fixed shape, in contrast to the power transmission mechanism 300 shown in FIG. 9. Consequently, power transmission mechanisms 100 and 200 having fixed shape is able to transmit power with higher stability. However, the power transmission mechanism 300 shown in FIG. 9 is disposed with a plurality of transmission elements 302, so the shape of the power transmission mechanism 300 can be adjusted according to actual requirement without being limited to ring-like shape. Therefore, the power transmission mechanism 300 shown in FIG. 9 is with more extensive application.

Figure 12:
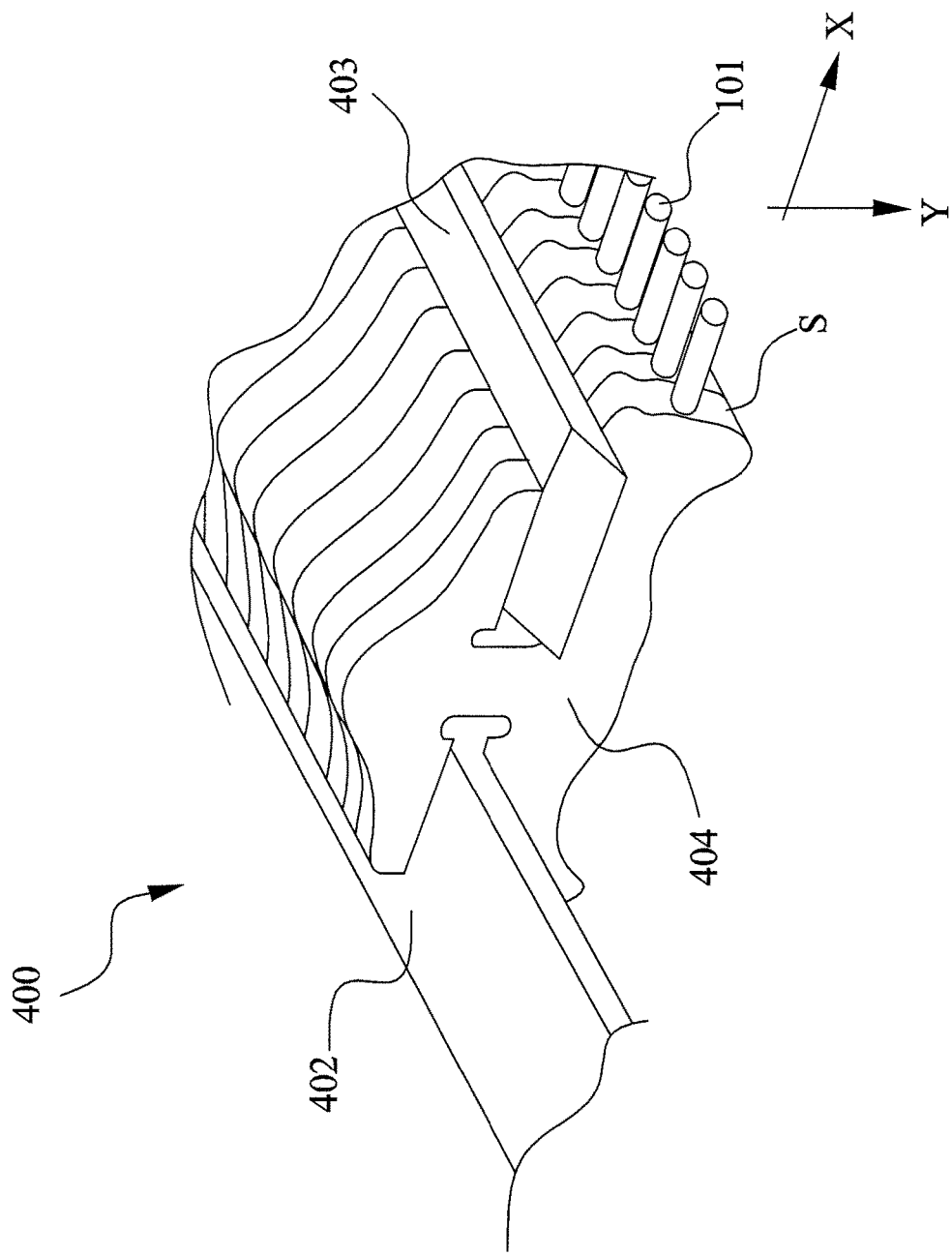
FIG. 12 is a 3D diagram of one more embodiment of the power transmission mechanism of the present disclosure.
Figure 13:
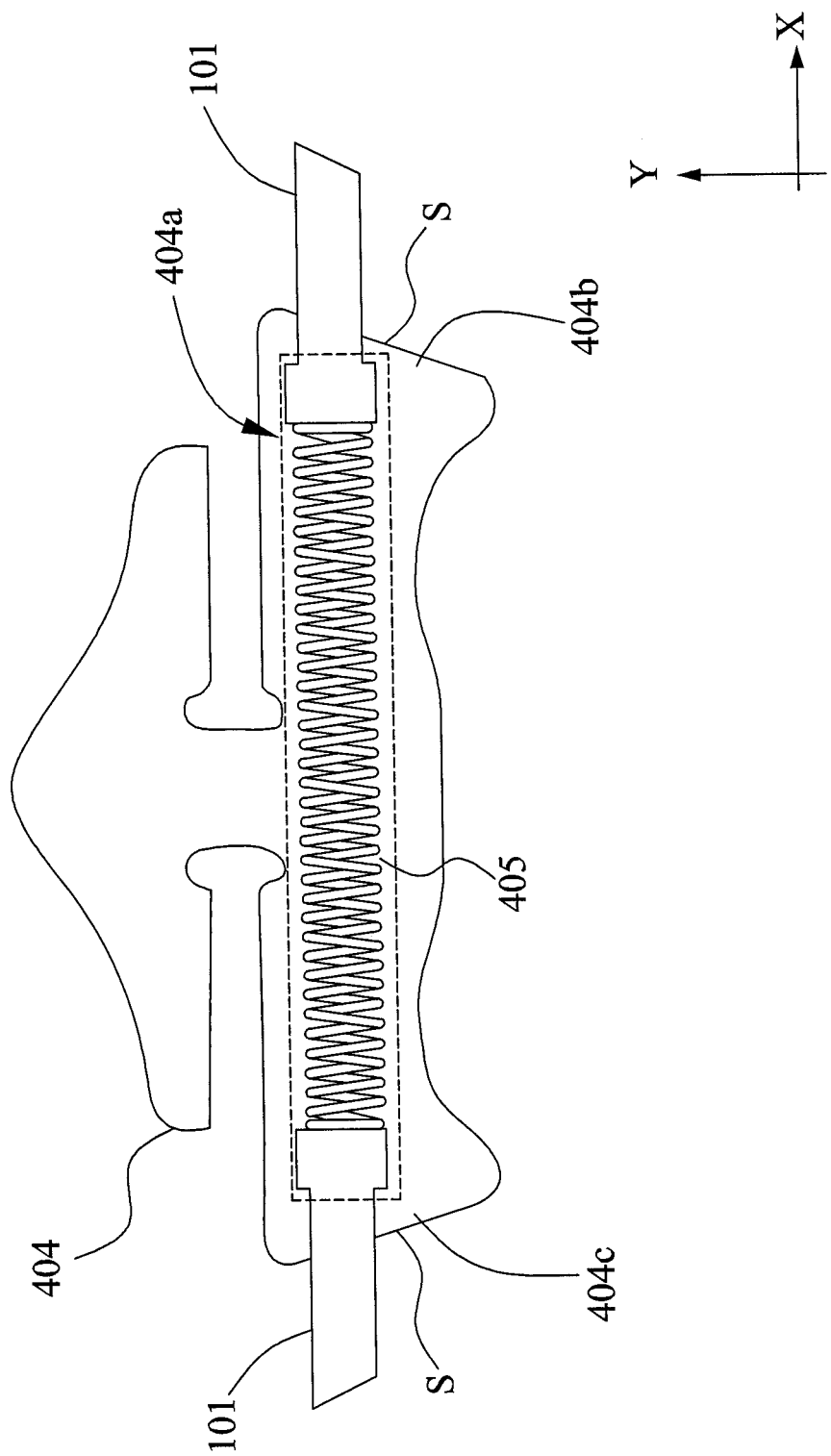
FIG. 13 is a schematic diagram of the internal structure of the clamping piece shown in FIG. 12.

Referring to FIG. 12 and FIG. 13, which are respectively a 3D diagram of one more embodiment of the power transmission mechanism of the present disclosure and a schematic diagram of the internal structure of the clamping piece shown in FIG. 12. As shown in the figures, the power transmission mechanism 400 includes transmission belts 402 and 403, and a plurality of clamping pieces 404. The plurality of clamping pieces 404 clamp respective sides of the transmission belts 402 and 403. In the present embodiment, the clamping pieces 404 clap respective sides of the transmission belts 402 and 403, wherein the respective sides of the transmission belts 402 and 403 are opposite to each other. That is to say, the clamping pieces 404 are disposed between the transmission belts 402 and 403, but it shall not be limited thereto. In the other embodiments, the power transmission mechanism 400 can be disposed with only one transmission belt.

Referring to FIG. 12 and FIG. 13 again, each of the clamping pieces 404 includes an accommodating space 404a and the flexible element 405, and the flexible element 405 is disposed in the accommodating space 404a. One of the engaging elements 101 mentioned in the previous embodiments may slidably penetrate one side 404b of the clamping pieces 404 and couples to one end of the flexible element 405. The other one of the engaging elements 101 mentioned in the previous embodiments may slidably penetrate the other side 404c of the clamping pieces 404 and couples to the other end of the flexible element 405. As a consequence, the extension or contraction of the flexible element 405 of the present embodiment endows the engaging elements 101 of the power transmission mechanism 400 with the ability to retract, so that the power transmission mechanism 400 is able to engage the conical disks 120a, 120b, 120c and 120d.

In contrast to the power transmission mechanism 300, i.e. the chain-like power transmission mechanism 300 shown in FIGS. 9-11, the transmission belts 402 and 403 of the power transmission mechanism 400 of the present embodiment higher operation stability. In addition, the transmission belts 402 and 403 of the power transmission mechanism 400 of the present embodiment are bendable; therefore the overall shape of the power transmission mechanism 400 is adjustable according to actual needs.

In practice, the transmission belts 402 and 403 may be the metal transmission belts formed via laminating thin sheets of metal together to achieve the bendability to certain extend. One skilled in the art should be familiar with the metal transmission belt applicable in the continuously variable transmission 10 of the present invention so the unnecessary details are omitted herein.

The foregoing embodiments have disclosed various embodiments of the conical disks 120a, 120b, 120c and 120d and the power transmission mechanisms 100, 200, 300 and 400. It shall be addressed herein that such embodiments are merely illustrative. As long as the engaging elements 101 extending from the contact surface S of the power transmission mechanisms 100, 200, 300 and 400 are able engage with the conical disks 120a, 120b, 120c and 120d, a device with such configuration shall belong to the claimed scope of the present disclosure. Besides, in one or more selected embodiments, the contact surface S of the power transmission mechanisms 100, 200, 300 and 400 is an inclined plane, and the inclined contact surface S of the power transmission mechanisms 100, 200, 300 and 400 and the disk surface of the conical disks 120a, 120b, 120c and 120d have substantially equal gradients.

As shown in the figures illustrating the power transmission mechanisms 100, 200, 300 and 400 such as FIGS. 7, 8, 11 and 12, it can be found that the contact surface S of the transmission mechanisms 100, 200, 300 and 400 and the disk surface of the conical disks 120a, 120b, 120c and 120d shown in the FIGS. 4 and 6 have close if not substantially equal displacement ratios in X-axial and Y-axial directions. As a result, when the contact surface S of the transmission mechanisms 100, 200, 300 and 400 is moving back and forth relative to the center C and the outer region O of the conical disks 120a, 120b, 120c and 120d, the contact surface S of the transmission mechanisms 100, 200, 300 and 400 and the disk surface of the conical disks 120a, 120b, 120c and 120d do not interfere with one another.

Furthermore, in the previous embodiments, the engaging elements 101 are arranged as a circle along the contact surface S, but it shall not be limited thereto. In the other embodiments, the engaging elements 101 may be arranged as two or more circles along the contact surface S. In one embodiment, the engaging elements 101 are arranged as different circles in a staggered manner. So, the engaging elements 101 arranged in either lines or rows are capable of promoting the stability when the power transmission mechanism 400 engages with the conical disks 120a, 120b, 120c and 120d, such that the continuously variable transmission provided in the present disclosure can be applied to the high torsion surroundings.

Figure 14:
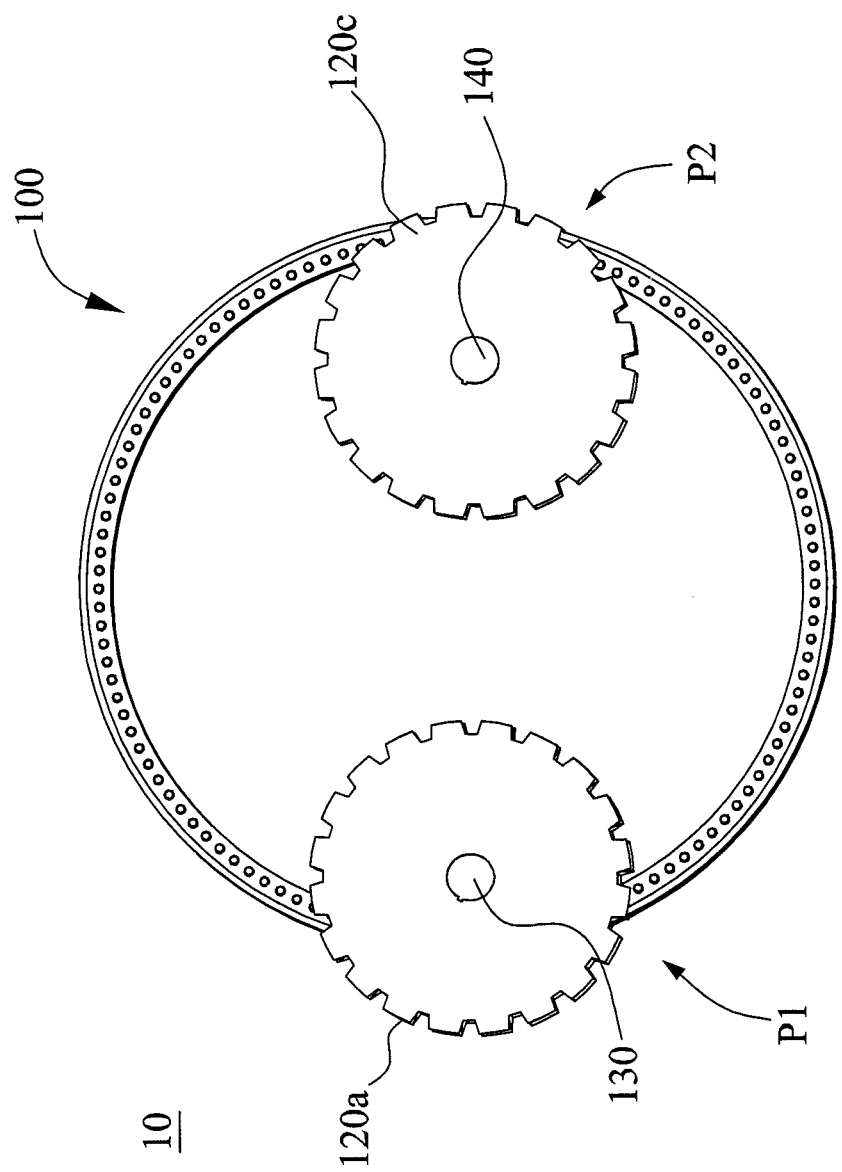
FIG. 14 is a side view of one embodiment of the continuously variable transmission of the present disclosure.

FIG. 14 is a side view of one embodiment of the continuously variable transmission of the present disclosure. As shown in the figure, the continuously variable transmission 10 further includes a first transmission shaft 130 and a second retransmission shaft 140. The first transmission shaft 130 couples with the conical disks 120a and 120b, and the second transmission shaft 140 couples with the conical disks 120c and 120d; reference can be made along with FIG. 1 and FIG. 2. In the present embodiment, the positions P1 and P2 where engaging elements 101 of the power transmission mechanism 100 engage with the conical disks 120a, 120b, 120c and 120d are at the respective sides of the first transmission shaft 130 and the second transmission shaft 140, wherein the respective sides of the first transmission shaft 130 and the second transmission shaft 140 are away from each other, but the present invention shall not be limited thereto.

Figure 15:
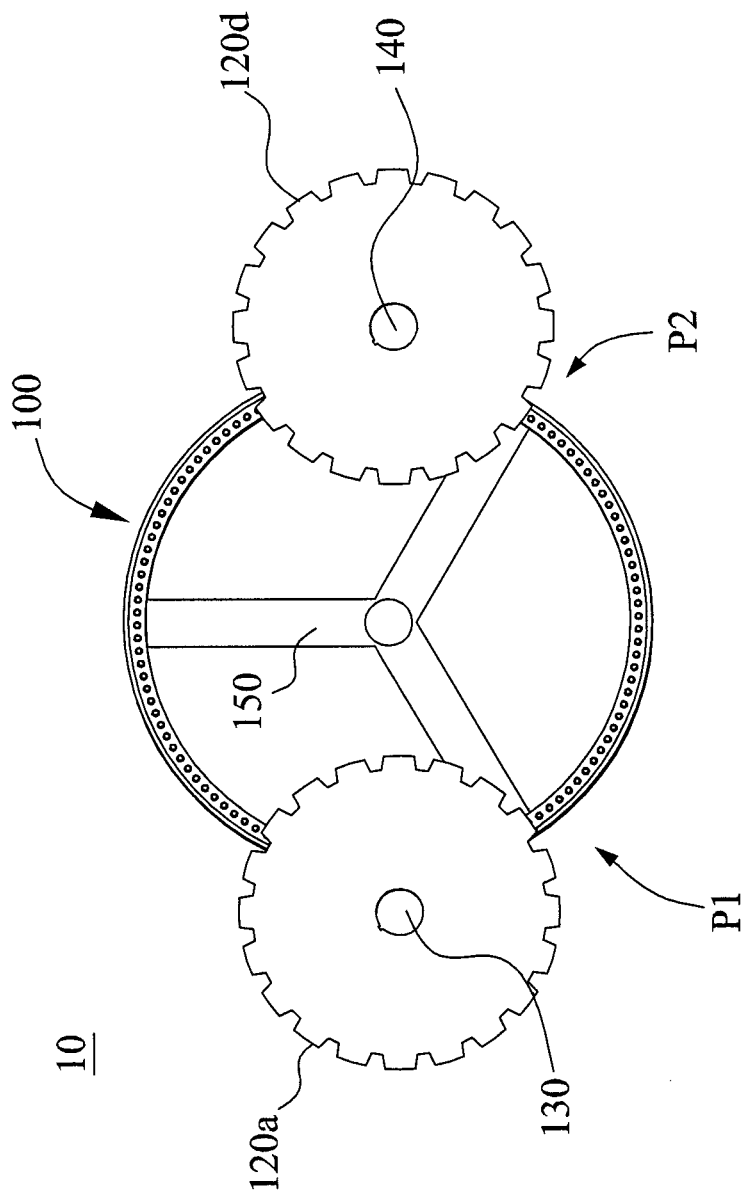
FIG. 15 is a side view of the other embodiment of the continuously variable transmission of the present disclosure.

FIG. 15 is a side view of the other embodiment of the continuously variable transmission 10 of the present disclosure. As shown in the figure, the positions P1 and P2 where the engaging elements 101 of the power transmission mechanism 100 engage with the conical disks 120a, 120b, 120c and 120d are at the respective sides of the first transmission shaft 130 and the second transmission shaft 140, wherein the respective sides of the first transmission shaft 130 and the second transmission shaft 140 are opposite to each other. In the selected embodiments shown in FIG. 14 and FIG. 15, the relative position between the conical disks 120a, 120b, 120c and 120d and the power transmission mechanism 100 can be adjusted. For example, the continuously variable transmission 10 shown in FIG. 15 occupies a smaller space so the continuously variable transmission 10 is able to fit into smaller machines. In addition, in the selected embodiment shown in FIG. 14, the movement of the power transmission mechanism 100 is constrained by the pressure exerted by the conical disks 120a, 120b, 120c and 120d so the power transmission mechanism 100 is able to remain in the stable position. In other words, the position of the power transmission mechanism 100 can be stabilized by the conical disks 120a, 120b, 120c and 120d without additional stabilization mechanisms. As for the continuously variable transmission 10 shown in FIG. 15, a stabilization mechanism 150 is further included to stabilize the power transmission mechanism 100.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:
1. A continuously variable transmission, comprising:
   a power transmission mechanism having a contact surface, and the power transmission mechanism comprising a plurality of engaging elements retractably disposed on the contact surface, and
   at least one conical disk having a plurality of engaging walls extending from a center of the conical disk to an outer region of the conical disk; each engaging wall having a side wall and a top wall, wherein the top wall faces the contact surface, and the side wall is connected to the top wall and substantially extends along a tangent of a radial direction of the conical disk;
   wherein some of the engaging elements are in contact with the side wall while some of the engaging elements are in contact with the top wall.
2. The continuously variable transmission of claim 1, wherein the power transmission mechanism further comprises:
   an internal power transmission ring;

a first external power transmission ring disposed at one side of the internal power transmission ring; and a flexible element disposed in the internal power transmission ring;

wherein one of the engaging elements is disposed at one end of the flexible element and penetrates the first external power transmission ring.

3. The continuously variable transmission of claim 2, wherein the power transmission mechanism further comprises:

a second external power transmission ring disposed at the other side of the internal power transmission ring;

wherein another one of the engaging elements is disposed at the other end of the flexible element and penetrates the second external power transmission ring.

4. The continuously variable transmission of claim 1, wherein the contact surface and a disk surface of the conical disk have substantially equal gradients.

5. The continuously variable transmission of claim 1, wherein the power transmission mechanism further comprises:

a power transmission ring having a recess, and a flexible element disposed in the recess;

wherein one of the engaging elements slidably penetrates one sidewall of the recess and couples to one end of the flexible element, and another one of the engaging elements slidably penetrates the other sidewall of the recess and couples to the other end of the flexible element.

6. The continuously variable transmission of claim 1, wherein the power transmission mechanism further comprises:

a plurality of transmission elements, wherein two adjacent transmission elements are pivotally coupled with each other, each transmission element comprises:

a tubular body, and a flexible element disposed in the tubular body;

wherein one of the engaging elements slidably penetrates one side of the tubular body and couples to one end of the flexible element, and another one of the engaging elements slidably penetrates the other side of the tubular body and couples to the other end of the flexible element.

7. The continuously variable transmission of claim 1, wherein the power transmission mechanism further comprises:

a transmission belt, and a plurality of clamping pieces clamping one side of the transmission belt, wherein each clamping piece comprises:

an accommodating space, and a flexible element disposed in the accommodating space;

wherein one of the engaging elements slidably penetrates one side of the clamping pieces and couples to one end of the flexible element, and another one of the engaging elements slidably penetrates the other side of the clamping pieces and couples to the other end of the flexible element.

8. The continuously variable transmission of claim 1, wherein the conical disk is a ratchet-like conical disk or a gear-like conical disk.

9. The continuously variable transmission of claim 1, wherein there are at least four conical disks, and the continuously variable transmission further comprises a first transmission shaft and a second transmission shaft; the first transmission shaft couples with two of the conical disks and the second transmission shaft couples with two other conical disks, and positions where the engaging elements of the power transmission mechanism engage with the conical disks are at respective sides of the first transmission shaft and the second transmission shaft; wherein the respective sides of the first transmission shaft and the second transmission shaft are away from each other.

10. The continuously variable transmission of claim 1, wherein there are at least four conical disks, and the continuously variable transmission further comprises a first transmission shaft and a second transmission shaft; wherein the first transmission shaft couples with two of the conical disks and the second transmission shaft couples with two other conical disks, and positions where the engaging elements of the power transmission mechanism engage with the conical disks are at respective sides of the first transmission shaft and the second transmission shaft; wherein the respective sides of the first transmission shaft and the second transmission shaft are opposite to each other.

* * * * *